(12) United States Patent
Mathiowetz

(10) Patent No.: US 6,315,311 B1
(45) Date of Patent: Nov. 13, 2001

(54) SELF-STOWING WHEELED SUPPORT STRUCTURE

(75) Inventor: Reinhold P. Mathiowetz, Marshall, MN (US)

(73) Assignee: R and G Construction Co., Marshall, MN (US)

( * ) Notice: Subject to any disclaimer, the term of this patent is extended or adjusted under 35 U.S.C. 154(b) by 0 days.

(21) Appl. No.: 09/660,114

(22) Filed: Sep. 12, 2000

(51) Int. Cl.⁷ ................................................. B62D 61/12
(52) U.S. Cl. .................... 280/86.5; 180/22; 180/24.02; 180/209; 280/43.23; 280/81.1
(58) Field of Search ................ 280/81.1, 86, 86.5, 280/43, 43.17, 43.23, FOR 161, 789; 180/22, 24.02, 209

(56) References Cited

U.S. PATENT DOCUMENTS

| | | | |
|---|---|---|---|
| 3,912,293 | * 10/1975 | Harbers | 280/81.1 |
| 4,079,798 | * 3/1978 | Ferris | 280/767 |
| 4,082,305 | 4/1978 | Allison et al. | 280/81 R |
| 4,848,783 | 7/1989 | Christenson et al. | 280/405.1 |
| 5,540,454 | * 7/1996 | VanDenberg et al. | 280/86.5 |
| 5,549,322 | * 8/1996 | Hauri | 280/86.5 |
| 5,823,629 | 10/1998 | Smith et al. | 298/23 R |
| 5,897,123 | 4/1999 | Cherney et al. | 280/86.5 |
| 6,116,698 | * 9/2000 | Smith et al. | 280/86.5 |

* cited by examiner

*Primary Examiner*—Eric Culbreth
(74) *Attorney, Agent, or Firm*—Nawrocki, Rooney & Sivertson, P.A.

(57) ABSTRACT

A wheeled support structure reversibly deployable from a stowed condition on the bed of a trailer to aid in rolling support of a load thereupon is provided. The support structure includes a frame, pivotable through a range of motion exceeding 90 degrees and having forward and rearward portions, and an actuator assembly capable of reversibly deploying the frame from a stowed condition on the bed of the trailer. The rearward frame portion includes a tag axle assembly and means for limiting energy transfer from the tag axle assembly to the frame as when the wheeled support structure is deployed to aid in rolling support of a load being hauled by the trailer. The actuator assembly cooperatively links the trailer to the forward portion of the frame.

18 Claims, 8 Drawing Sheets

SELF-STOWING WHEELED SUPPORT STRUCTURE

TECHNICAL FIELD

The present invention relates to a wheeled support structure, and in particular to a retractable, self-stowing wheeled support structure for supplementing carriage of heavy equipment and the like on a trailer.

BACKGROUND OF INVENTION

Haulers always desire to carry the maximum load possible. To prevent undue deterioration of highways, other road surfaces, bridges and the like, lawmakers have enacted legislation imposing weight restrictions on vehicles travelling over state and federal roadways. Typically, the weight restrictions are measured in terms of load per axle and the overall spacing between axles. It is readily apparent that if the number axles of the truck and the spacing thereof can be increased, a given vehicle may carry a heavier payload than would otherwise be permitted.

In order to increase the load capable of being carried by dump trucks, ready-mix cement trucks or other work type vehicles, trailing tag axle assemblies have been attached to the vehicles at the rear ends thereof to more sufficiently distribute the weight of the cargo thereon. Each trailing tag axle assembly has a trailing tag axle at the back of the assembly, with a set of non-powered wheels attached to the axle. The tag axle assemblies generally assist in balancing heavy loads and permit carriage of loads not otherwise permitted due to improved weight distribution provided thereby. As the tag axle is not required, and even prohibited from ground engagement and travel, during a "return" trip (i.e., empty or deadhead transport), retractability or selective stowage is a sought after feature for such tag axle assemblies.

An initial approach to tag axle retractability, meeting with limited success and having a narrow range of hauling applications, was that illustrated in U.S. Pat. No. 4,082,305 issuing to Allison et al. Here, the auxiliary wheels are not satisfactorily elevated when in a stowed condition to clear curbs, rough terrain, etc. as is typically encountered when leaving a finished road to enter a construction area.

Subsequent efforts addressing ground clearance issues focused upon elevatingly rotating tag axle assemblies at the end of arms, which may or may not be extendible, to a substantial, often times prohibited, height above the ground using hydraulic means operatively coupled between the vehicle and the arms. Such assemblies are typically stowed for deployment in an overhead and rearward position with respect to the hauling vehicle. As known assemblies are heavy, and particularly bulky, stowage becomes a challenge, necessitating a balance be struck between a variety of factors, for instance, available space for stowage, deployment clearance (i.e., the space over and above the vehicle, or portions thereof, in the vicinity of the stowage area), and the spacing of the tag axle relative to the other vehicle axles when deployed so as to achieve the desired additional or incremental load bearing capacity for the vehicle. Furthermore, in a stowed condition, the assemblies are frequently positioned substantially above the center of gravity for the vehicle, making the entire vehicle top heavy, and often times interfering with the loading and unloading operations associated with hauling.

Further disadvantages of heretofore known tag axle assemblies result from the inability of the trailing tag axle assembly to respond quickly, smoothly and efficiently to bumps and dips in the road while the axle is deployed for supplemental load bearing. This is a potential safety concern for the driver of such vehicles, and those drivers with whom he or she shares the roadways. Additionally, since load hauling vehicles are frequently driven over unpaved, rough and uneven surfaces, continuous jarring of the components of the tag axle assembly is a certainty, with twisting and a variety of other forces detrimentally acting thereon. Such repeated stress affects the structural integrity of tag axle assemblies, limiting its useful life and thereby implicating the cost of hauling such loads.

SUMMARY OF THE INVENTION

A wheeled support structure reversibly deployable from a stowed condition on the bed of a trailer to aid in rolling support of a load thereupon is provided. The support structure includes a frame, pivotable through a range of motion exceeding 90 degrees and having forward and rearward portions, and an actuator assembly capable of reversibly deploying the frame from a stowed condition on the bed of the trailer. The rearward frame portion includes a tag axle assembly and means for limiting energy transfer from the tag axle assembly to the frame as when the wheeled support structure is deployed to aid in rolling support of a load being hauled by the trailer. The actuator assembly cooperatively links the trailer to the forward portion of the frame.

More specific features and advantages will become apparent with reference to the DETAILED DESCRIPTION OF THE INVENTION, appended claims, and the accompanying drawing figures.

DETAILED DESCRIPTION OF THE INVENTION

Figure 1:
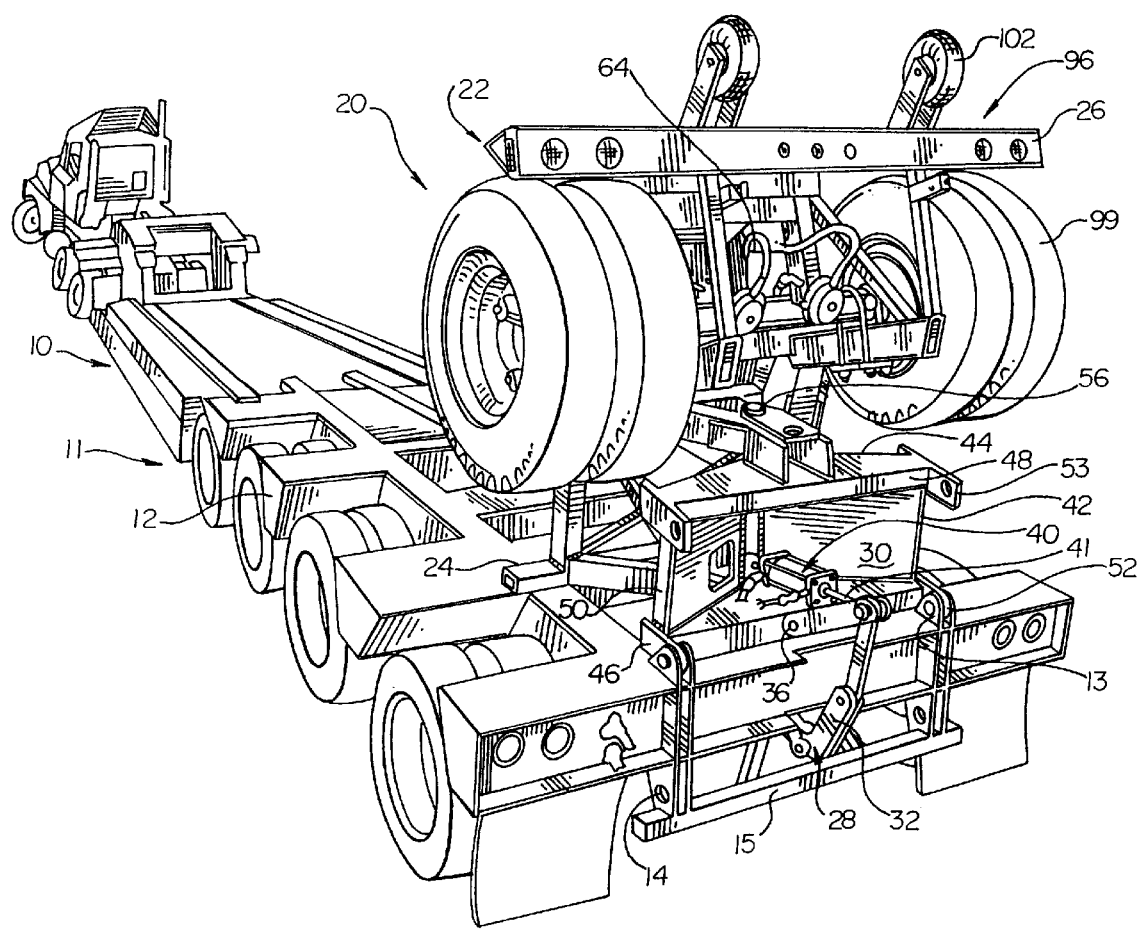
FIG. 1 is a perspective rear view of a low boy trailer illustrating the wheeled support structure in a stowed condition.
Figure 2:
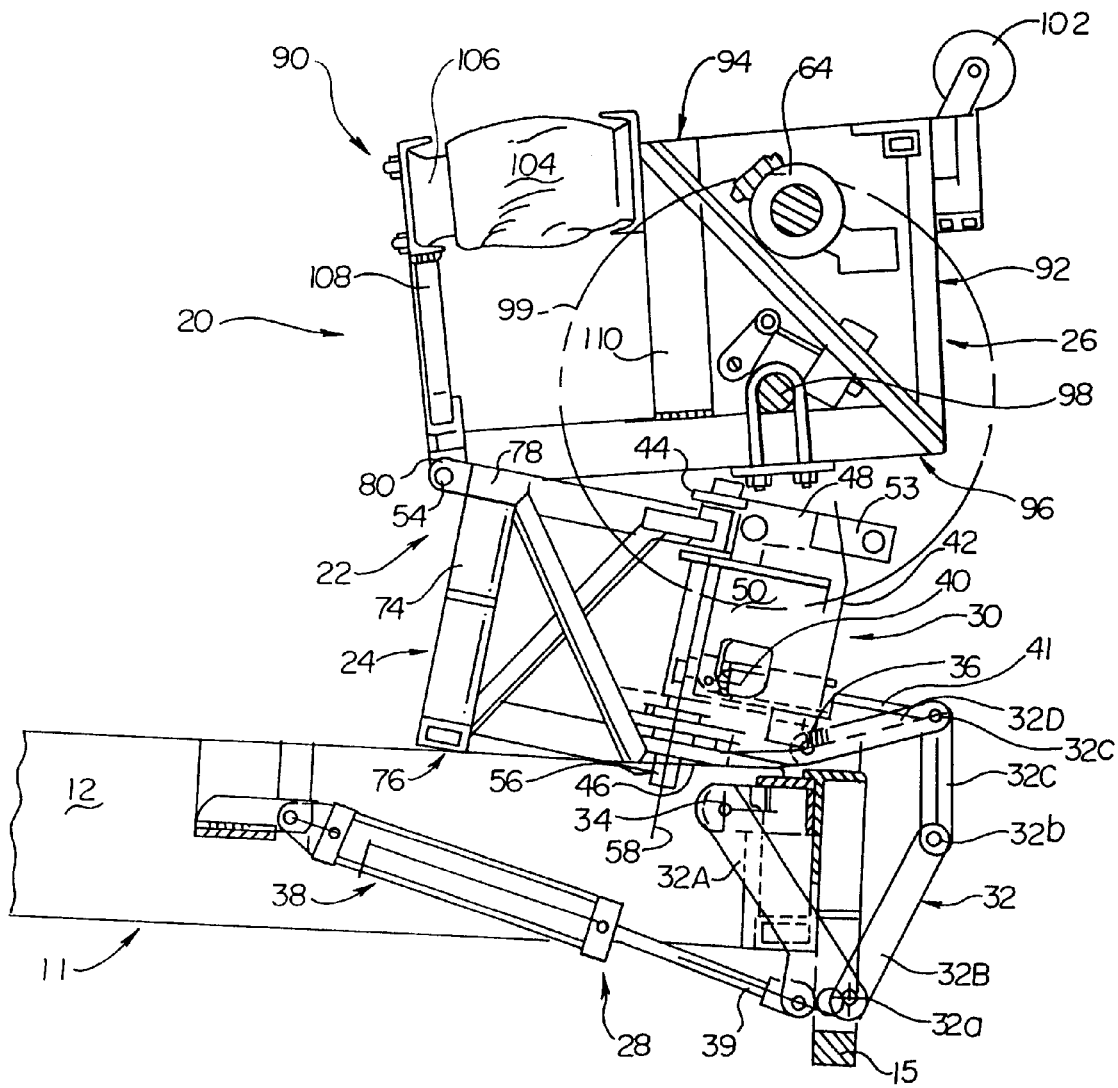
FIG. 2 is a sectional elevation illustrating the wheeled support structure in a stowed condition.

Referring to FIGS. 1 & 2, the wheeled support structure 20 is shown in a fully stowed and compact condition, piggybacked upon the rearward end 11 of a low-boy trailer 10. The wheeled support structure 20 generally includes a frame 22 having forward 24 and rearward 26 portions or segments, and an actuator assembly 28, linking the trailer 10 to the forward portion 24 of the frame 22. The actuator assembly 28 is capable of reversibly deploying the frame 22, which is pivotable through a range of motion exceeding 90 degrees, from a stowed condition (FIGS. 1 & 2), through intermediate conditions (e.g., FIGS. 4–6), and to a full deployed condition (FIGS. 7 & 8). A presentation and detailed discussion of the features of the retractable wheeled support structure, proceeding rearwardly from its interface with the trailer to its free end, immediately follows, with discussion of operation thereafter.

Referring now to FIGS. 1–3 & 8, the actuator assembly 28 of the retractable wheeled support structure 20 generally includes a trailer linkage 30 adapted to cooperatively join the forward portion 24 of the frame 22 to the trailer 10, and a segmented arm 32 joining the chassis 12 of the trailer 10 to the trailer linkage 30 (i.e., the segmented arm 32 has a first free end 34 joined to the trailer chassis 12 and a second free end 36 joined to the trailer linkage 30). The segmented arm 32 is further joined to the chassis 12 of the trailer 10 by a primary hydraulic piston 38, and to the trailer linkage 30 by a secondary hydraulic piston 40.

The trailer linkage 30 is a structural member adapted to be hingedly connected to the chassis 12 of the trailer 10. The trailer linkage 30 may have a variety of configurations, and generally has forward 42, rearward 44, upper 46 and lower 48 ends. The trailer linkage 30 further has converging side surfaces 50 which intersect at the rearward end 44 thereof (FIG. 1).

Figure 3:
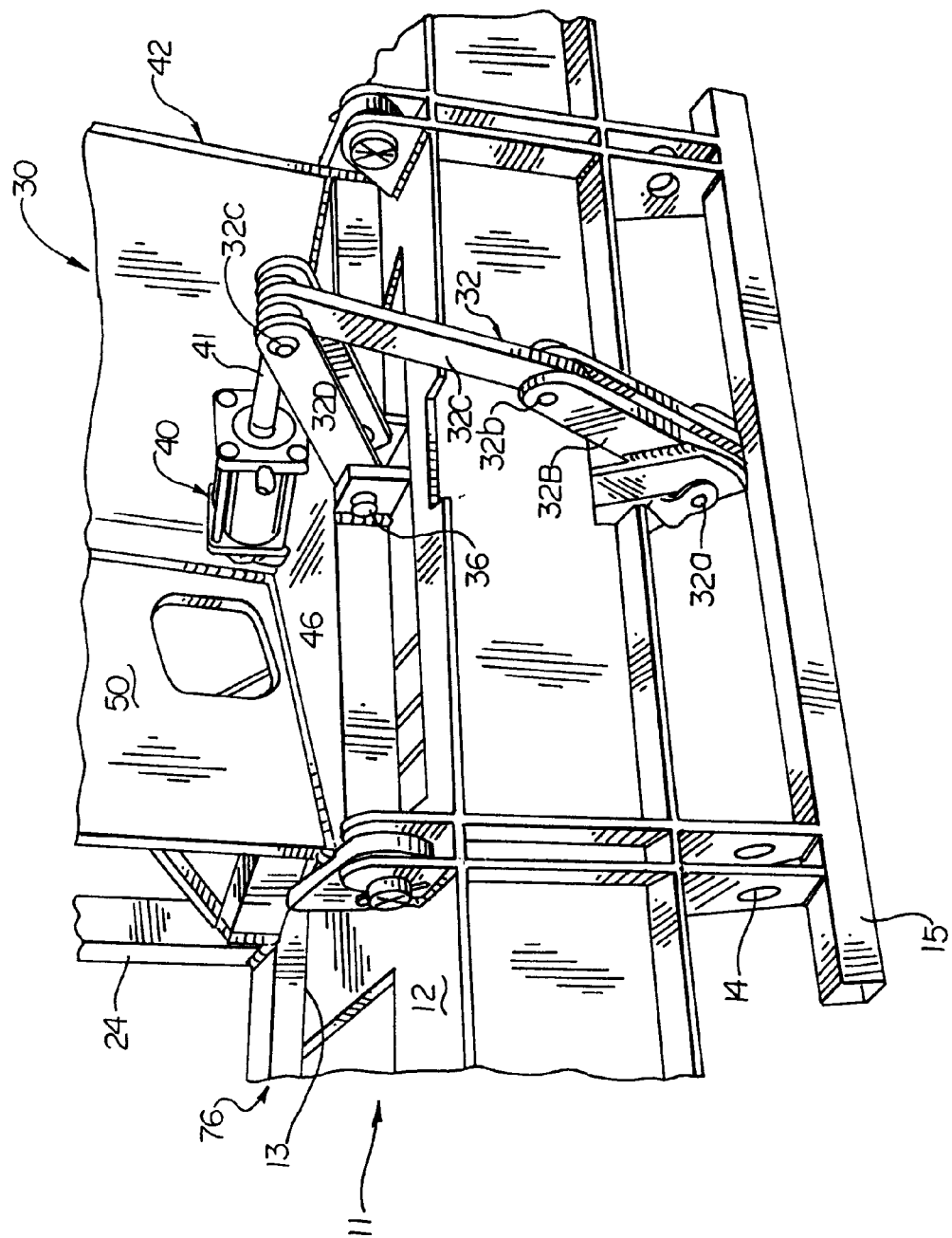
FIG. 3 is a partial perspective rear view of a low boy trailer illustrating portions of the actuator assembly of the wheeled support structure while in a stowed condition.

The forward end 42 of the trailer linkage 30 is preferably equipped with forward extending, opposingly aligned upper 52 and lower 53 brackets, at both its upper 46 and lower 48 ends. Each of the upper brackets 52 of the trailer linkage 30 are received between paired mating brackets 13 extending from the chassis 12. The upper end 46 of the trailer linkage 30 is secured thereto for hinged motion using known structures, such as bearings, bolts, pins, etc. This hinged connection directly and continuously joins the trailer linkage 30 to the trailer 10 and establishes a horizontal axis or joint 54 about which the wheeled support structure 20 is pivotable for reversible deployment. The lower brackets 53 of the trailer linkage 30 are reversibly receivable in apertures 14 carried by the chassis 12 (e.g., in the crash guard 15 depending therefrom, as best seen in FIGS. 1 & 3), and securable therein using known hardware, when and while the wheeled support structure 20 is in a fully deployed condition. This connection directly and selectively joins (i.e., secures) the trailer linkage 30 to the trailer 10.

The converging rearward end 44 of the trailer linkage 30 cooperatively engages the forward portion 24 of the frame 22 via a hitch pin 56. The hitch pin 56, part of an assembly well known to those of skill in such art, defines a substantially vertical axis 58 about which the frame 22 is pivotable, relative to the actuator assemble 28 and trailer chassis 12, when the wheeled support structure 20 is deployed for load bearing purposes. This capability generally enhances trailer maneuverability (e.g., cornering, loading and unloading operations, etc.).

The segmented arm 32 of the actuator assembly 28 has opposing ends 34 & 36 connecting the trailer chassis 12 to the trailer linkage 30. A first free end 34 is anchored to the chassis 12 (FIG. 2), whereas the second free end 36 is anchored to the trailer linkage 30 (FIG. 3), at a central point along the upper forward portion of the linkage.

With particular reference to FIG. 2, the segmented arm 32 comprises four joined segments (i.e., 30A through 30D) that form three "internal" joints (i.e., 30a through 30c) about which each of the segments are pivotable. Portions of the segmented arm 32 are further connected, indirectly, to the chassis 12 and trailer linkage 30, namely via primary 38 and secondary 40 hydraulic pistons as best seen in FIG. 2. Specifically, the reversibly extendable shafts 39 & 41 of the pistons 38 & 40 respectively, are joined to the segmented arm 32 at the opposing ends of the anchored segments (i.e., segments 30A and 30D). The cylinders 43 of the hydraulic pistons 38 & 40, and associated hydraulic lines, are suitably positioned on the chassis 12 (FIG. 8) and trailer linkage 30 (FIG. 3), and mounted thereto, with an appropriate hydraulic fluid supply, controller, etc. (generally indicated at 64 throughout) carried by the trailer chassis 12 for animating and manipulating the segmented arm 32, and the frame 22 thereby.

The forward portion 24 of the frame 22 has forward 72, rearward 74, upper 76 and lower 78 ends. As discussed in relation to the actuator assembly 28, the forward end 72 is adpated to cooperatively engage the rearward end 44 of the trailer linkage 30. The upper 76 and lower 78 ends of the forward end 42 of the forward frame portion 24 are configured to receive and retain the hitch pin 56, thereby permitting the entire frame 22 to be capable of lateral pivoting about the hitch pin 56, to aid in cornering etc., while allowing this portion of the frame to rigidly extend from the actuator assembly 28. The forward end 72 of the forward frame portion 24 laterally diverges in a direction from its forward end 72 to its rearward end 74 (i.e., has an increasing width throughout its length).

The lower rearward end of the forward frame portion 24 is equipped, at its corners, with rearwardly projecting brackets 80 for receiving mating brackets carried by the lower forward end of the rearward frame portion 26. Hardware such as a pivot pins or the like secure the frame portions to each other, to thereby provide an articulated frame for the wheeled support structure. The articulated frame of the wheeled support structure, namely the horizontal axis 54 about which the rear frame portion 26 is pivotable, permits compact, collapsed and "folded" stowage of the frame 22, wherein the lower ends of each of the frame portions are adjacent one another (FIG. 2), and, as will be discussed later with respect to FIGS. 6 & 7, further allows for improved road contact and ground control. When so configured and stowed, the trailing tag axle is protected since it is disposed forwardly and substantially above the trailer chassis. Furthermore, the center of gravity of the wheeled support structure is as close as is practicable to the pivot point, tending to minimize the force required to be provided by the actuator assembly during reversible deployment.

The rearward portion 26 of the frame 22 has forward 90, rearward 92, upper 94 and lower 96 ends, and generally includes a trailing tag axle 98, a shock absorbing system 100, and wheels 102 which aid in deploying the wheeled support structure 20. As noted hereinabove, the rearward portion 26 of the frame 22 is pivotingly linked at its lower forward end to the lower rearward end of the forward portion 24 of the frame 22.

The trailing tag axle 98 is carried by the lower end 96 of the rearward frame portion 26, near the rearward end 92. Known hardware such as "U" clamps or the like connect the axle to this portion of the frame, with the axle 98 generally equipped with a set of non-powered, load bearing wheels 99.

The shock absorbing system 100 for the rear portion 26 of the frame 22 preferably includes resilient bladders 104 and bladder engaging elements or displacers 106, each bladder 104 being affixed at one end to each of the bladder engaging elements 106. Known hydraulic and hydraulic/pneumatic hybrid dampening systems may be suitably configured and adapted to the frame of the present invention as a means for providing a smooth ride upon the trailing tag axle, without detracting from the spirit or scope of the invention.

Forward 108 and central 110 support posts extend from the lower end 96 of the rear portion 26 of the frame 22 and carry the bladder engaging elements 106 and bladders 104 respectively. The central post 110 is rigidly joined or integral to the lower end 96 of the frame 26, whereas the forward post 108 is adapted to pivotingly connect to the lower forward end of the frame 26, at the joint 54 between frame portions 24 & 26. Each of the bladders 104 resiliently "spans" the distance between the support posts 108 & 110 to the extent that the forward post 108 carries the bladder engaging elements 106, the central post 110 carries the bladders 108, and each of the bladders 108 are joined to the bladder engaging elements 106. When the wheeled support structure 20 is fully deployed, angulation of the forward support 108 is rearwardly limited by the compressibility of the bladders, and forwardly limited by the forward portion 24 of the frame 22. In this way, the pivot motion about the joint 54 of the frame linkage (i.e., any change in elevation of the tag axle 98 with respect to the ground surface) compresses/elongates each of the bladders 104 relative to the bladder engaging elements 106 (FIG. 2) to thereby restore the rear portion 26 of the frame 22 to an equilibrium condition.

The resilient bladders 104 are preferably a natural or synthetic rubber, or other elastomer exhibiting both durability (i.e., repeated compression and elongation) and elasticity (i.e., a substantially complete return after compression, elongation, expansion or other deformation). The resilient bladders are very "air bag" like in their quality, and to some extent in their function. The bladders are adapted to be selectively expandable, as by fluid inflation or the like, to accommodate variability in cargo loads and road conditions. Preferably, the bladders are cylindrical, with their opposing ends responsively linking the frame portions.

Referring now generally to FIGS. 1, 2, & 4 through 8, the relationships between the reversibly retractable wheeled support structure 20 is shown throughout its range of deployment from its compact stowed condition as illustrated in FIGS. 1 & 2, to its elongated ground engaging deployed condition for improved weight distribution as illustrated in FIG. 8.

In the stowed condition of FIGS. 1 & 2, the wheeled support structure 20 is conveniently and efficiently positioned on the trailer 10 in a compact piggy back configuration. The portions 24 & 26 of the frame 22 are collapsed and folded onto each other about the joint 54 delimiting the forward 24 and rearward 26 portions thereof. The trailer linkage 30 and forward portion 24 of the frame 22 are stowed on the trailer 10 in a substantially upside-down alignment, with parts of the linkage 30 and frame 22 (e.g., portions of the hitch assembly) being tucked between otherwise unoccupied portions of the chassis 12 (note FIG. 8). The shafts 39 & 41 of both pistons 38 & 40 are substantially extended, causing the segmented arm 32 to be extended in a rearward most orientation with respect to the trailer chassis 12, such that actuation of the hydraulic system 64 and retraction of the pistons "pulls" the wheeled support structure from its stowed condition for subsequent deployment behind the trailer.

Figure 4:
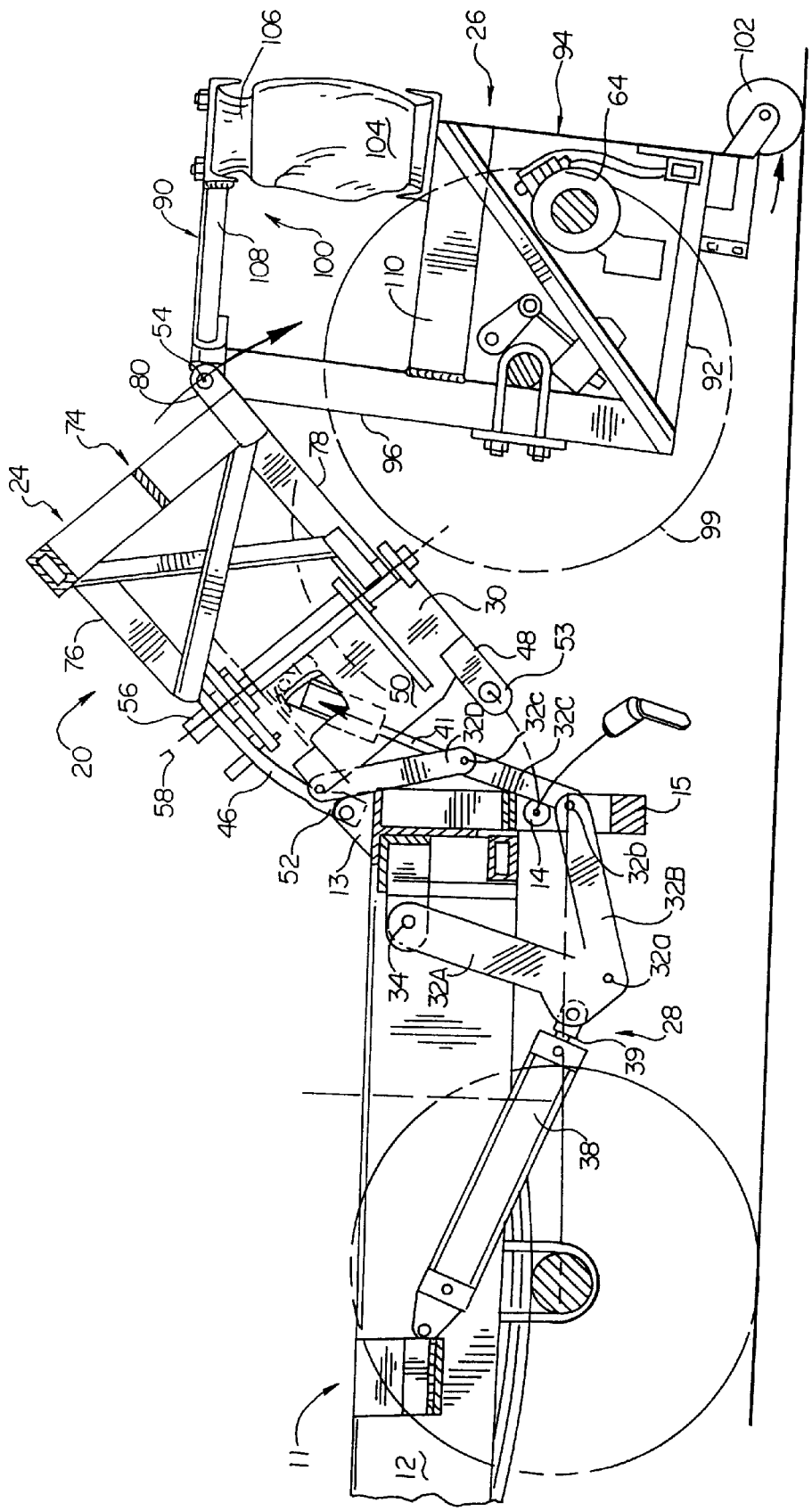
FIG. 4 is a sectional elevation of the wheeled support structure of the subject invention in an initial stage of deployment from a stowed condition.
Figure 5:
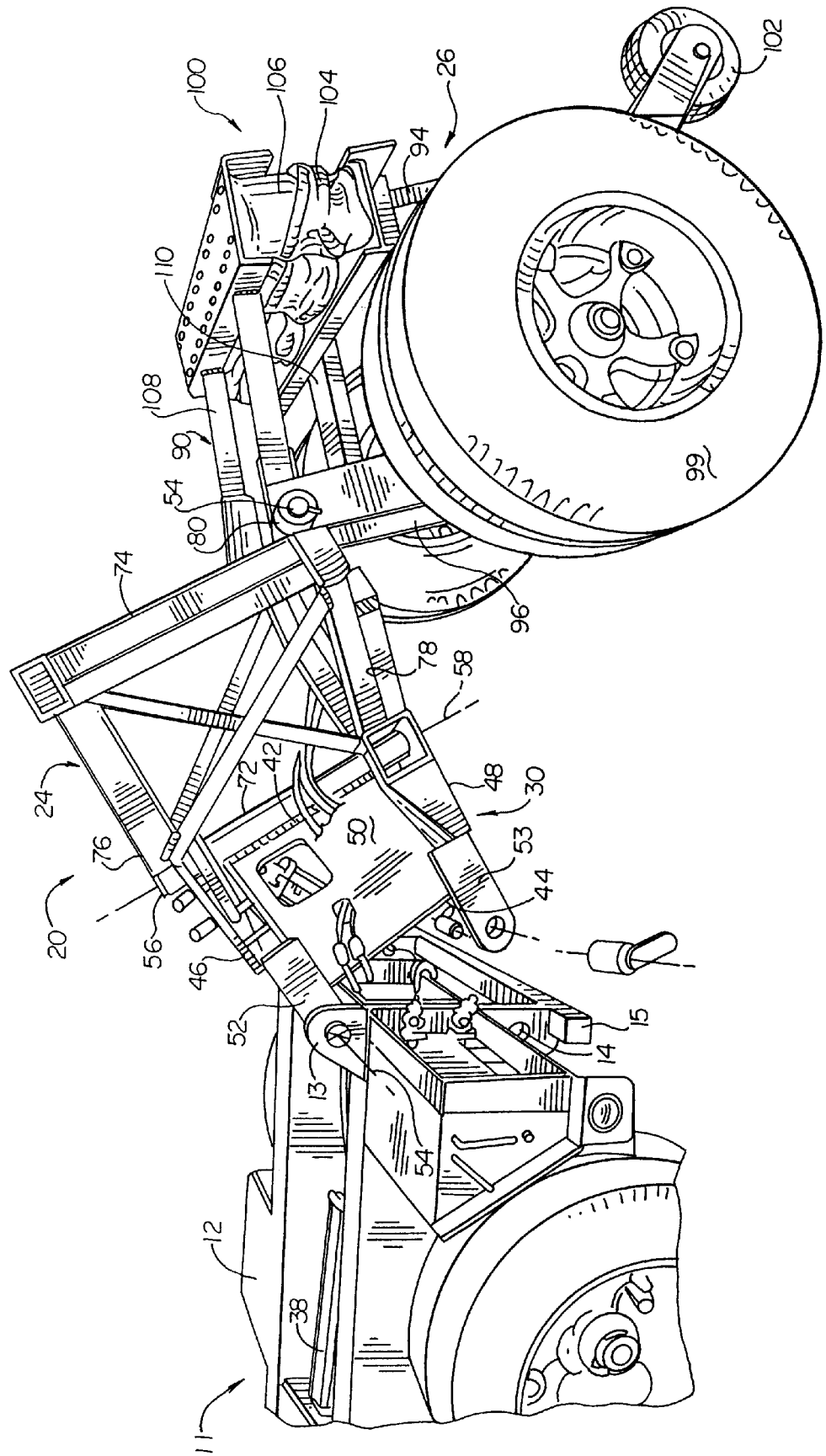
FIG. 5 is a perspective side view of the wheeled support structure of the subject invention, illustrating a subsequent stage of deployment from the initial stage of FIG. 4.

A preliminary mechanical step in the deployment of the wheeled support structure 20, as shown in FIG. 4, includes retraction of the shaft 39 of the primary hydraulic piston 38. This pivots the trailer linkage about the hinged connection between the trailer chassis and the linkage 30 so as to substantially position the forward portion 24 of the frame 22 behind the chassis 12 (FIGS. 4 & 5). In doing so, the forward portion 24 of the frame 22 begins to assume a "right-side-up" orientation, having been swung through about a 180 degree pivot, with alignment of the lower forward portion of this part of the frame with the trailer chassis, at the crash guard 15, for mating and securing via link pins during subsequent steps. Also occurring during the retraction of the primary piston 38, is the "landing" or first contact of the rear frame portion 26 with the ground or road surface (FIG. 4). Deploying wheels 102 positioned at the upper rear end of the rearward frame portion 26, and extending upward and rearward therefrom, engage the ground, permitting a rolling elongation of the frame 22 (i.e., reduction of the pivot angle about the frame joint 54), until the wheels 99 of the tag axle 98 are in a position to contact the ground surface for continuing the frame elongation function during subsequent deployment steps (FIGS. 5–7).

Figure 6:
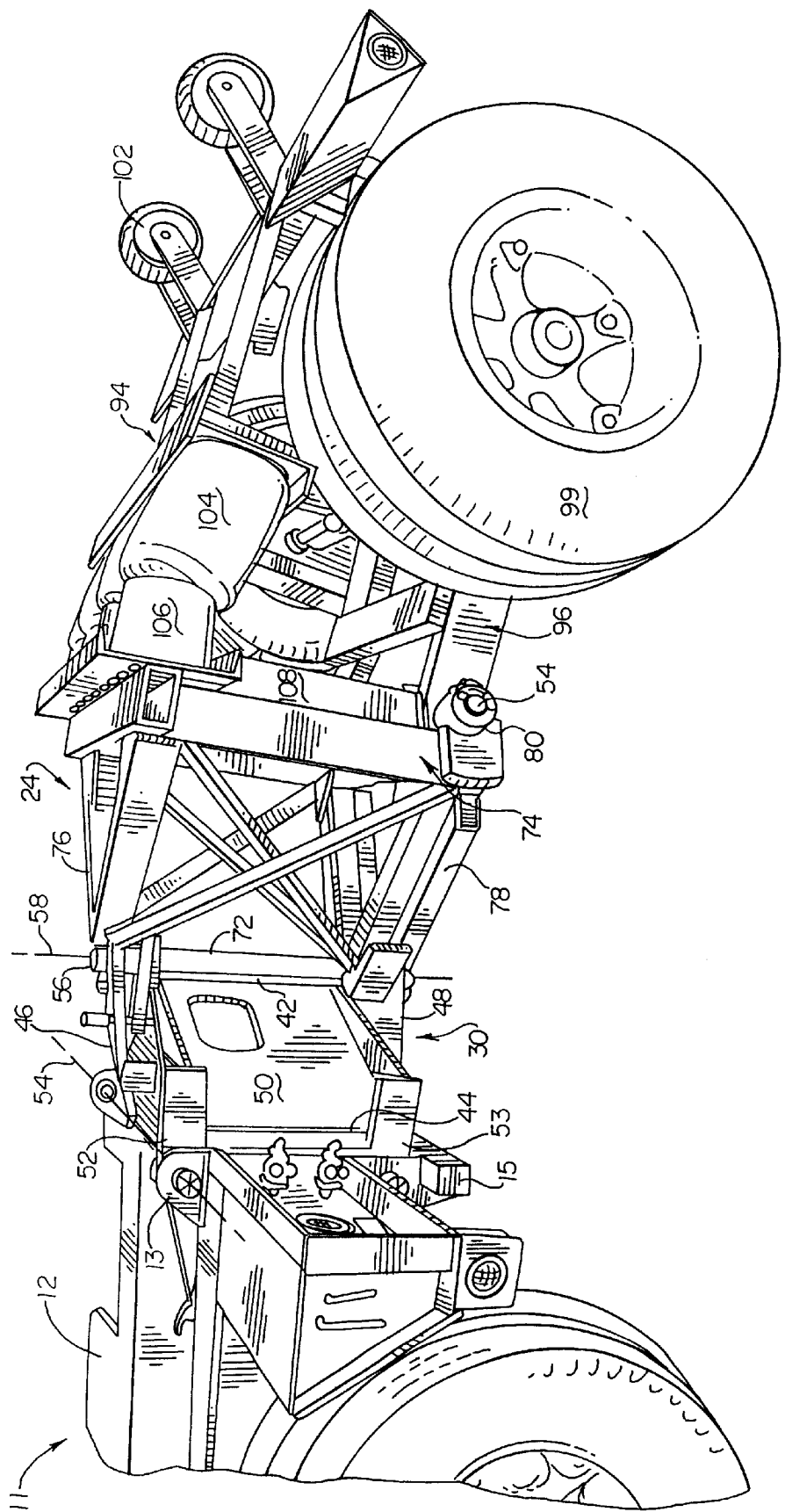
FIG. 6 is a perspective side view of the wheeled support structure of the subject invention, illustrating near full deployment from a stowed condition.
Figure 7:
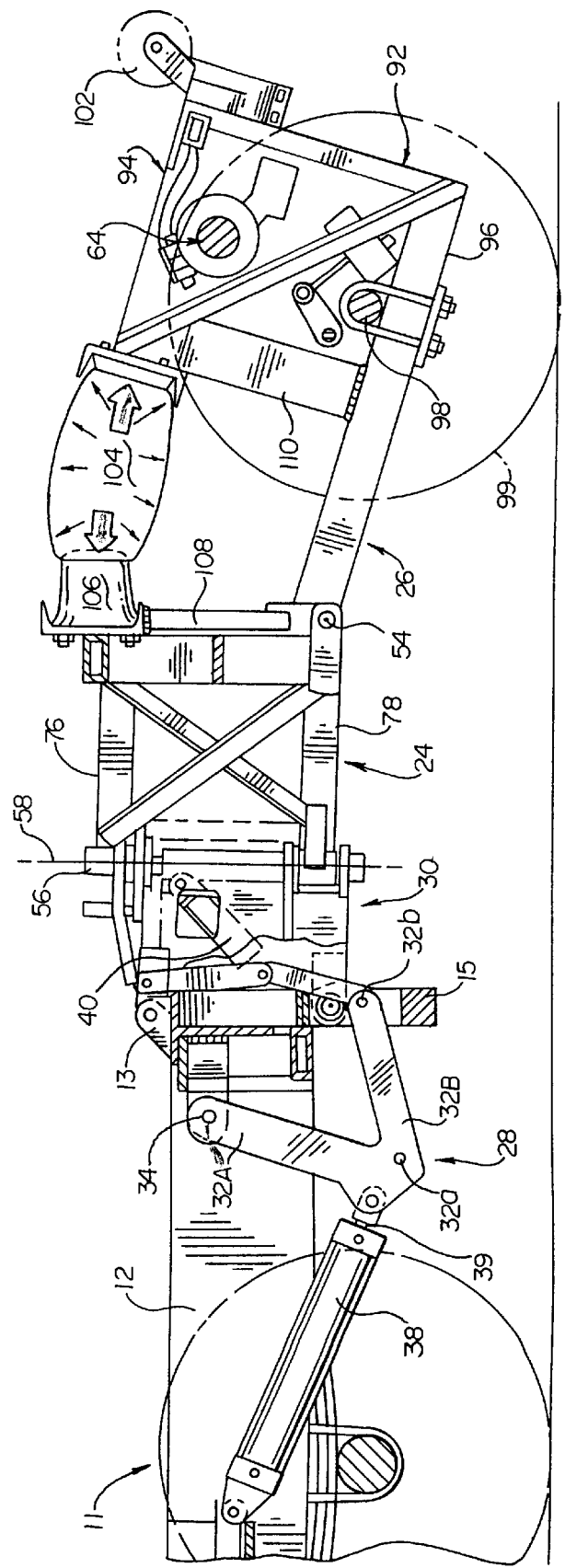
FIG. 7 is a sectional elevation of the wheeled support structure of the subject invention, illustrating full deployment from a stowed condition; and, FIG. 8 is a perspective top view of the fully deployed wheeled support structure as viewed from the low boy trailer.
Figure 8:
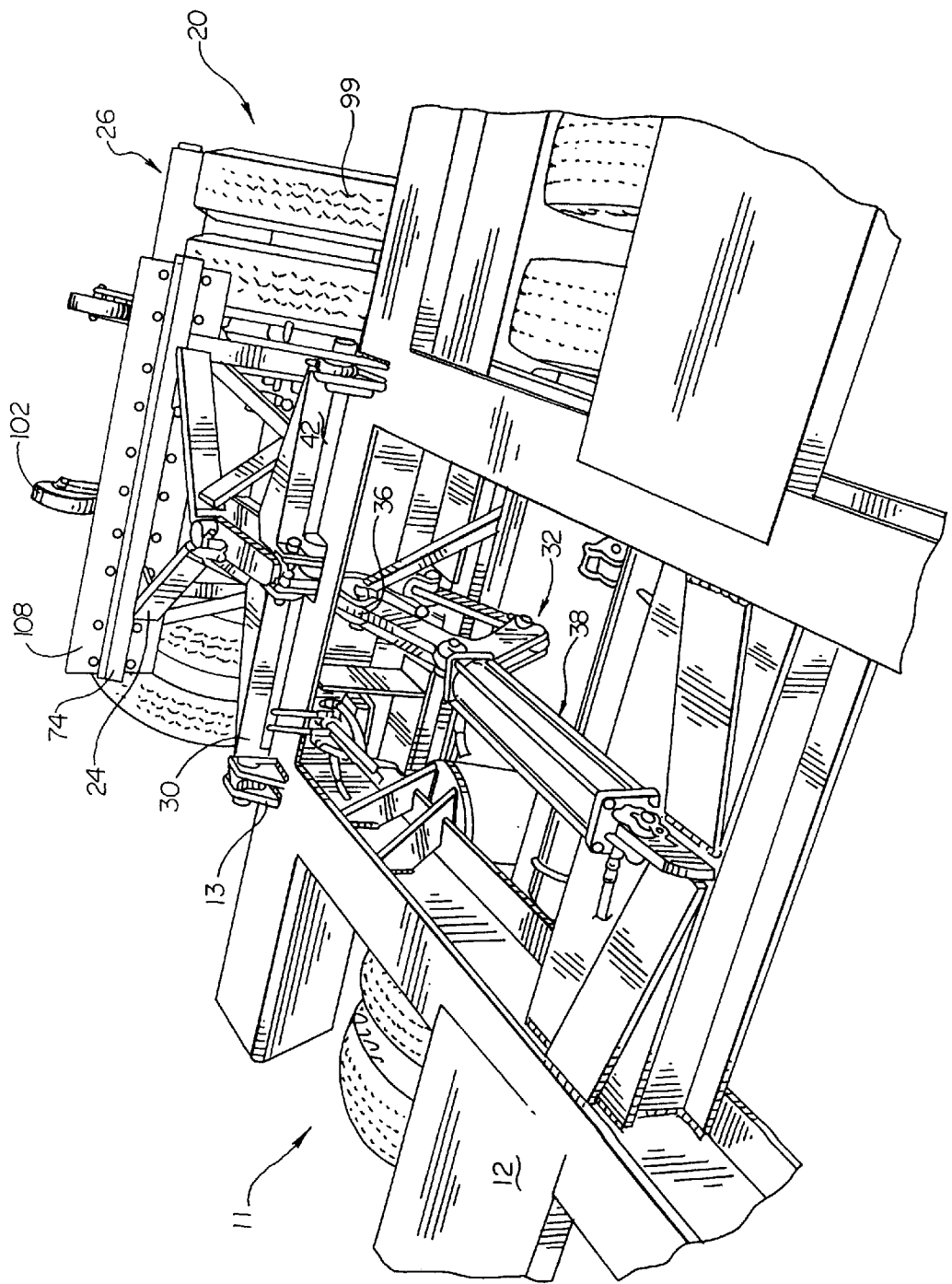

After retraction of the primary piston 38, the secondary hydraulic piston 40 is retracted from the extended condition of FIGS. 4 & 5, to the retracted condition of FIGS. 6 & 7. Here, the segmented arm 32 is "pulled" into close proximity to the back of the chassis 12 so as to complete the pivot rotation of the trailer linkage 30 relative to the chassis 12. Thereafter, the lower end 78 of the forward portion 24 of the frame 22 is secured to the trailer chassis 12 with the link pins, with the trailer linkage 30 and forward frame portion 24 being substantially aligned with the chassis 12 (i.e., those elements of the support structure form a longitudinal extension for the chassis).

In the fully deployed condition of FIG. 7, the rearward portion 26 of the frame 22 forms an obtuse angle with respect to the forward portion 24 of the frame 22 (i.e., the angle about the joint 54 linking the frame portions 24 & 26 exceeds 90 degrees). The bladders 104 of the shock absorbing system 100 are sufficiently charged or activated so as to bias the displacer support post(s) 108 in abutting engagement with and against the rear end 74 of the forward portion 24 of the frame 22. As previously noted, this is possible due to the ability of the displacer support post 108 to be pivotable about the frame joint 54 (compare FIGS. 4–7). As the rear portion 26 of the frame 22 is directly joined to the forward portion 24 of the frame 22 at the frame joint 54, and the upper frame 76 & 94 ends are indirectly joined (i.e., interfaced) via the shock absorbing system 10, a tag axle ride responsive to ground surface conditions is achieved.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A wheeled support structure reversibly deployable from a stowed condition on a bed of a trailer to aid in rolling support of a load thereupon, said support structure comprising a frame pivotable through a range of motion exceeding 90 degrees, said frame having forward and rearward portions and an actuator assembly capable of reversibly deploying said frame from a stowed condition on the bed of the trailer, said rearward frame portion including a tag axle assembly and means for limiting energy transfer from said tag axle assembly to said frame when said wheeled support structure is deployed to aid in rolling support of a load being hauled by the trailer, said actuator assembly cooperatively linking the trailer to said forward portion of said frame.

2. The wheeled support structure of claim 1 wherein said rearward frame portion is pivotably linked at a lower portion to a lower portion of said forward frame portion.

3. The wheeled support structure of claim 1 wherein said frame is articulated between said frame portions.

4. The wheeled support structure of claim 3 wherein said rearward frame portion is collapsible upon said forward frame portion about a joint delimiting an interface of said forward and rearward frame portions to facilitate compact stowage of said wheeled support structure on the bed of the trailer.

5. The wheeled support structure of claim 4 wherein said actuator assembly comprises a trailer linkage adapted to cooperatively join said forward portion of said frame to the trailer, and a segmented arm, said segmented arm having a first end joined to a chassis of the trailer, and a second end joined to said trailer linkage.

6. The wheeled support structure of claim 5 wherein said trailer linkage is connectable to said forward portion of said frame by a hitch pin, said hitch pin defining a substantially vertical axis about which said frame is pivotable.

7. The wheeled support structure of claim 6 wherein said segmented arm is further joined to the chassis of the trailer by a primary hydraulic piston.

8. The wheeled support structure of claim 7 wherein retraction of said primary hydraulic piston substantially positions said frame rearward of the trailer.

9. The wheeled support structure of claim 7 wherein said segmented arm is further joined to said trailer linkage by a secondary hydraulic piston.

10. The wheeled support structure of claim 9 wherein said pistons are substantially extended while said wheeled support structure is in a stowed condition on the bed of the trailer.

11. The wheeled support structure of claim 9 wherein said pistons are substantially retracted while said wheeled support structure is in a deployed condition to aid in rolling support of a load upon the trailer.

12. The wheeled support structure of claim 9 wherein retraction of said secondary hydraulic piston positions said trailer linkage rearward of the trailer.

13. The wheeled support structure of claim 9 wherein said rearward frame portion forms an obtuse angle relative to said forward frame portion upon retraction of said secondary hydraulic piston.

14. The wheeled support structure of claim 12 wherein an axle of said tag axle assembly is positioned below said common horizontal plane when said wheeled support structure is deployed from a stowed condition.

15. The wheeled support structure of claim 3 wherein said means for limiting energy transfer responds to pivoting of said rearward frame portion about said joint, as when said articulated frame structure is deployed to aid in rolling support of a load, so as to maximize wheel to ground contact for said tag axle assembly.

16. The wheeled support structure of claim 15 wherein said means for limiting energy transfer comprises a resilient bladder and a bladder engaging element affixed to said resilient bladder.

17. The wheeled support structure of claim 16 wherein said bladder engaging element is adapted to abut an upper portion of said forward frame portion, said resilient bladder being anchored to said rearward portion of said frame.

18. A self stowing wheeled support structure deployable from a stowed condition on a bed of a trailer, said wheeled support structure comprising:

(a) an articulated frame having forward and rearward segments, said rearward frame segment being collapsible upon said forward frame segment about a joint delimiting an interface of said forward and rearward segments to facilitate compact stowage of said wheeled support structure on the bed of the trailer, said rearward frame segment comprising a tag axle assembly and means for limiting energy transfer from said rearward frame segment to said forward frame segment during pivoting of said rearward frame segment relative to said forward frame segment about said joint in response to road conditions encountered by said wheeled support structure when deployed to aid in rolling support of a load; and, (b) an actuator assembly capable of reversibly deploying said frame from the stowed condition on the bed of the trailer, said actuator assembly cooperatively linking the trailer to said forward segment of said articulated frame so as to permit pivoting of said frame through a range of motion exceeding 90 degrees during deployment of said frame.

* * * * *